United States Patent Office 3,684,428
Patented Aug. 15, 1972

3,684,428
PROCESS FOR PRINTING TEXTILE MATERIALS OF NATURAL OR REGENERATED CELLULOSE WITH REACTIVE DYESTUFFS
Horst Homuth, Ludwigsburg, Erich Feess, Losbach, Taunus, and Wolfram Schidlo, Kelkheim, Taunus, Germany, assignors to Farbwerke Hoechst Aktiengesellschaft vormals Meister Lucius & Brüning, Frankfurt am Main, Germany
No Drawing. Continuation of application Ser. No. 681,103, Nov. 7, 1967. This application May 4, 1970, Ser. No. 31,884
Claims priority, application Germany, Nov. 12, 1966, F 50,665
Int. Cl. D06p 1/38, 3/66
U.S. Cl. 8—62            3 Claims

ABSTRACT OF THE DISCLOSURE

Process for printing textile materials of natural or regenerated cellulose with reactive dyestuffs by printing on said textile materials a printing paste containing a thickening agent, water and either an organic dyestuff containing at least one of the known reactive groups, or an organic dyestuff containing at least one nucleophilic group, and a colourless organic compound which contains at least two reactive groups which are capable of reacting both with the fibre and with the nucleophilic groups of said dyestuff, then padding the print so obtained, after drying, with an aqueous salt-containing solution of an agent having an alkaline reaction and subsequently dwelling the plaited fabric.

---

This application is a continuation of application Ser. No. 681,103, filed Nov. 7, 1967, and now abandoned.

Belgian patent specification No. 679,670 describes a printing process in which the reactive dyestuff is fixed fast onto textile material of natural or regenerated cellulose by applying the dyestuff to the textile material in the first step by means of a printing paste which contains water and a thickening agent and, after drying, padding the print in the second step with an aqueous solution which contains an agent having an alkaline reaction, and subsequently exposing the printed fabric to air, i.e. exposing the treated and spread out material to the action of air before plaiting it. Generally, the minimum period for exposing the print to air is between 1 and 5 minutes. The print thus obtained is then rinsed with cold water and treated with hot water, subsequently soaped, rinsed again and finally dried.

According to the afore-named process reactive dyestuffs having a lower reactivity cannot be applied because a prolonged exposure to air corresponding to a prolonged fixing period of these dyestuffs cannot be realized on an industrial scale.

The present invention is based on the observation that reactive dyestuffs may be fixed fast onto textile materials of natural or regenerated cellulose by printing on the textile material either an organic dyestuff which contains at least one β-hydroxyethylsulphone sulphuric acid ester group, a vinylsulphone group, a monochlorotriazine group, a dichlorotriazine group, a 2,2,3,3-tetrafluorocyclobutane-1-acryloylamino group, a vinyl-sulphonylamino group, a β-phenylsulphonylpropionylamino group or a dichloroquiooxaline radical, or an organic dyestuff containing at least one nucleophilic group and a colourless organic compound which contains at least two reactive groups which are capable of reacting with the fibre and with the nucleophilic groups of said dyestuff, by means of a printing paste which further contains water and a thickening agent, then padding the print so obtained, after drying, with an aqueous salt-containing solution of an agent having an alkaline reaction and subsequently dwelling the plaited fabric at about room temperature, for example, in the range of from 10° to 30° C. If required the padded print is exposed to air for a very short time, for example 5 to 30 seconds, before plaiting and dwelling it.

In comparison with the known process described in Belgian Pat. No. 679,670, the fixing process according to the present invention allows the use of reactive dyestuffs having a lower reactivity.

Moreover, in comparison with said hitherto applied printing process, the present invention possesses the advantage that reactive dyestuffs having a high reactivity with the fibre—in spite of the high content of alkalies in the padding solution and the long dwelling time, in some cases lasting for several hours—can be fixed without a reduction of the colour yield by a re-saponification of the binding dyestuff-fibre occurring.

During the dwelling the printed textile material can be piled up on each other; staining does not occur.

As reactive dyestuffs there may be used according to the process of the present invention dyestuffs from different organic dyestuff classes, for example, azo dyestuffs and anthraquinone dyestuffs which contain at least one of the known reactive groups mentioned above or dyestuffs of such kind which—owing to the presence of nucleophilic groups—are capable of reacting with a colorless compound which contains at least two reactive groups, said groups being capable of reacting both with the fibre and with the nucleophilic groups in said dyestuffs.

As compounds containing at least two reactive groups which are capable of reacting with the fibre and with dyestuffs containing nucleophilic groups there may be used, for example:

(a) 1,3,5-tri-(acryloyl)-hexahydro-s-triazine of the formula

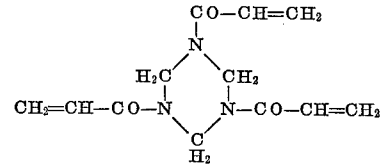

(b) Methylene-bisacrylic acid amide of the formula

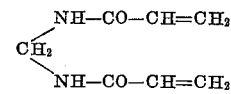

(c) 2,4,6-triethyleneimino-s-triazine of the formula

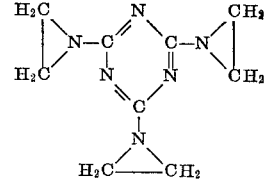

As dyestuffs capable of reacting with colourless compounds which contain at least two reactive groups there are preferably used azo dyestuffs and anthraquinone dyestuffs which contain as nucleophilic groups for example, sulphonic acid amide groups, N-monosubstituted sulphonic acid amide groups, hydroxy groups, mercapto groups and/or acetoacetyl groups and/or heterocyclic ring systems containing imino groups.

As the agent having an alkaline reaction an alkali metal hydroxide is preferably used. The period during which the print in its open width is exposed to air depends on the concentration of the agent having an alkaline reaction to such an extent that the required period of contact of the printed material with the air is reduced with increasing concentration of alkali. If, for example, 100 cc. of sodium hydroxide solution (38° Bé.) are used per litre of padding solution, the required minimum period for exposing the print to air is about 10 seconds. The minimum period for dwelling the plaited print generally amounts to between 1 minute and 3 hours. For fixation of the dyestuffs it is, however, possible to subject the printed goods for a substantially longer period to dwelling, in some cases for example up to 15 hours, without a reduction of the colour yield occurring in the presence of the alkalies.

In general, it is preferable to adjust the concentration of the alkali in the padding solution in such a way that the pH-value is in the range of from about 13 to 14. The optimum concentration of alkali and the period of contact of the printed material in the air must be regulated in each case according to the reactive dyestuff used, or according to the colourless compound containing at least two reactive groups.

Suitable thickening agents are neutral thickening agents or thickeners having a weakly alkaline reaction, for example, alginates, different types of gum, or alkyl celluloses or hydroxyethyl celluloses.

The present invention enables the fixation also of reactive dyestuffs showing lower reactivity which, according to the process disclosed in Belgian Pat. No. 679,670, cannot be applied. Moreover, in comparison with this hitherto practised fixation method the present invention represents the technical advance in that, when reactive dyestuffs are used, which can be applied according to the known process, the air treatment is considerably reduced or can be completely omitted.

The following examples illustrate the invention, the parts being by weight unless otherwise stated:

EXAMPLE 1

40 parts of the dyestuff of the formula

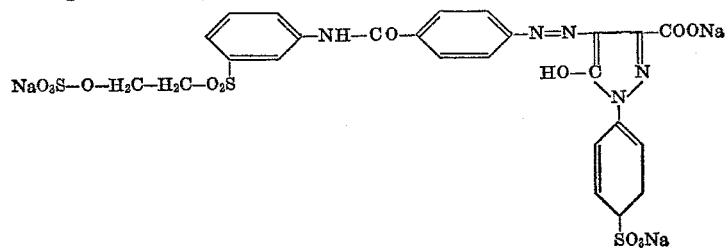

were mixed with 50 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener.

After the addition of 15 parts of the sodium salt of metanitrobenzene sulphonic acid, the whole was made up to 1000 parts by the addition of 195 parts of water.

The printing paste, prepared in such a way, was then printed on a cotton fabric by means of a roller printing machine. After drying, the printed fabric was padded with a solution consisting of 100 parts by volume of sodium hydroxide solution (38° Bé.), 150 parts of sodium carbonate, 180 parts of sodium chloride, 50 parts of potassium carbonate and made up to 1000 parts by volume with water, and then the plaited fabric is dwelled for 5 seconds at 20° C.

The print thus obtained was then rinsed for about 10 minutes with cold water, treated for 3 minutes with hot water which contained 3 parts of a complex forming agent on the base of a polymeric sodium meta-phosphate per 1000 parts by volume, subsequently soaped for about 10 minutes with an aqueous solution of 1% strength of a synthetic detergent (sodium salt of the condensation product of oleic acid and N-methyl taurine) and finally rinsed and dried.

A yellow print was obtained having a good fastness to light and wet processing.

EXAMPLE 2

40 parts of the dyestuff described in Example 1 were mixed according to the method of the said example to form a printing paste. This printing paste was printed on a cotton fabric by means of a roller printing machine. After drying, the printed fabric was padded with a solution consisting of 100 parts by volume of sodium hydroxide solution (38° Bé.), 150 parts of sodium carbonate, 180 parts of sodium chloride, 50 parts of potassium carbonate, and made up to 1000 parts by volume with water, and then exposed to air for 8 seconds. The plaited fabric was then allowed to dwell for 15 hours at 15° C.

After finishing the fabric as described in Example 1, a yellow print was obtained, having a good fastness to light and wet processing.

EXAMPLE 3

40 parts of the dyestuff of the formula

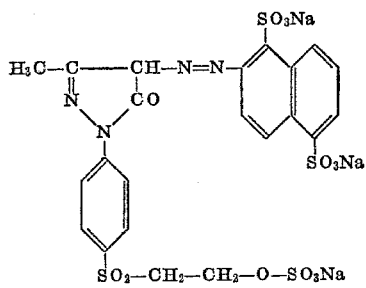

were mixed with 50 parts of urea, dissolved in 300 parts of hot water and introduced into 400 parts of an aqueous methylhydroxyethyl-cellulose of 4%.

After the addition of 15 parts of the sodium salt of metanitrobenzenesulphonic acid the whole was made up to 1000 parts by the addition of 195 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 10 seconds. The plaited fabric was then allowed to dwell for 10 minutes at 20° C.

After finishing the fabric as described in Example 1, a yellow print was obtained, having good fastness to light and wet processing.

EXAMPLE 4

40 parts of the dyestuff described in Example 3 were mixed according to the method of said example to form a printing paste. This printing paste was printed on a cotton fabric by means of a roller printing machine. After drying, the printed fabric was padded with a solution consisting of 30 parts by volume of sodium hydroxide solution (38° Bé), 150 parts of sodium carbonate, 180 parts of sodium chloride, 50 parts of potassium carbonate and made up to 1000 parts by volume with water, and then exposed to an air passage for 10 seconds. The plaited fabric was then allowed to dwell for 45 minutes at 18° C.

After finishing the fabric as described in Example 3, a yellow print was obtained, having a good fastness to light and wet processing.

EXAMPLE 5

40 parts of the dyestuff described in Example 3 were mixed according to the method of said example to form a printing paste. This printing paste was printed on a staple fibre fabric by means of a roller printing machine. After drying, the printed fabric was padded with a solution consisting of 30 parts by volume of sodium hydroxide solution (38° Bé.), 150 parts of sodium carbonate, 180 parts of sodium chloride, 50 parts of potassium carbonate and made up to 1000 parts by volume with water, and then exposed to an air passage for 10 seconds. The plaited fabric was then stored for 45 minutes at 18° C.

After finishing the fabric as described in Example 3, a yellow print was obtained having a good fastness to light and wet processing.

EXAMPLE 6

40 parts of the dyestuff of the formula

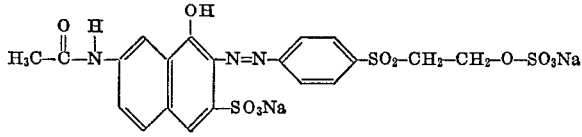

were mixed with 50 parts of urea, dissolved in 300 parts of hot water and introduced into 400 parts of an aqueous hydroxy-ethyl-cellulose of 4%. After the addition of 10 parts of the sodium salt of meta-nitrobenzene sulphonic acid the whole was made up to 1000 parts by the addition of 200 parts of water. The printing paste prepared in such a way was then printed on a cotton fabric by means of a roller printing machine. After drying, the printed fabric was padded with a solution consisting of 100 parts by volume of sodium hydroxide solution (38° Bé.), 150 parts of sodium carbonate, 180 parts of sodium chloride, 50 parts of potassium carbonate and made up to 1000 parts by volume with water, and then exposed to air for 15 seconds. The plaited fabric was then allowed to dwell for 80 minutes at 20° C.

After finishing the fabric as described in Example 1, an orange print was obtained, having a good fastness to light and wet processing.

EXAMPLE 7

40 parts of the dyestuff of the formula

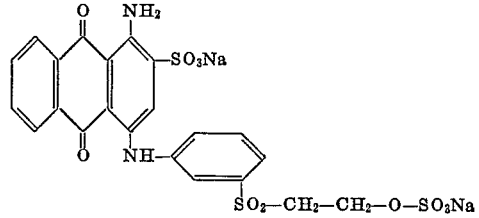

were mixed with 50 parts of urea, dissolved in 300 parts of hot water and introduced into 400 parts of aqueous alginate thickener of 4% which contained 5 parts of a complex forming agent on the base of polymeric sodium meta-phosphate per 1000 parts of thickener.

After the addition of 15 parts of the sodium salt of meta-nitrobenzene sulphonic acid, the whole was made up to 1000 parts by the addition of 195 parts of water.

The printing paste prepared in such a way was then printed on a cotton fabric by means of a roller printing machine. After drying, the printed fabric was padded with a solution consisting of 30 parts by volume of sodium hydroxide solution (38° Bé.), 150 parts of sodium carbonate, 180 parts of sodium chloride, 50 parts of potassium carbonate, and made up to 1000 parts by volume with water and then exposed to air for 20 seconds. The plaited fabric was then allowed to dwell for 2 hours at 20° C.

After finishing the fabric as described in Example 1, a blue print was obtained, having a good fastness to light and wet processing.

EXAMPLE 8

40 parts of the cobalt complex compound of the dyestuff of the formula

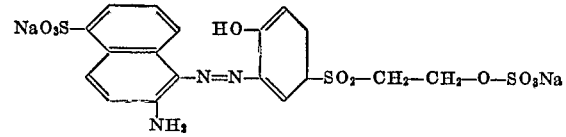

were mixed with 50 parts of urea, dissolved in 300 parts of hot water and introduced into 500 parts of an aqueous alginate thickener of 4%. After the addition of 10 parts of the sodium salt of meta-nitrobenzene sulphonic acid, the whole was made up to 1000 parts by the addition of 100 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 15 seconds. The plaited fabric was then stored for 3 hours at 25° C.

After finishing the fabric as described in Example 1, a black print was obtained, having a good fastness to light and wet processing.

EXAMPLE 9

40 parts of a mixture of dyestuffs of the formulae

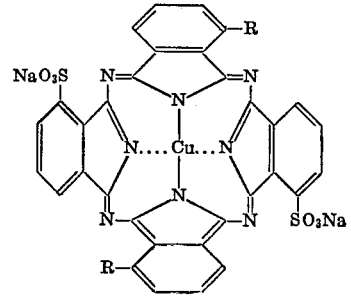

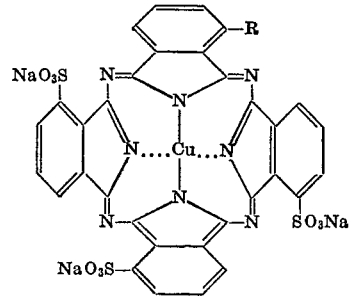

wherein R stands for the grouping

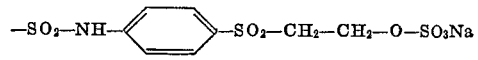

were mixed with 50 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener. After the addition of 15 parts of the sodium salt of meta-nitrobenzene-sulphonic acid, the whole was made up to 1000 parts by the addition of 195 parts of water.

The printing paste prepared in such a way was then printed on a cotton fabric by means of a roller printing machine. After drying, the printed fabric was padded with a solution consisting of 100 parts by volume of sodium hydroxide solution (38° Bé.), 150 parts of sodium carbonate, 180 parts of sodium chloride, 50 parts of potassium carbonate and made up to 1000 parts by volume with water, and then exposed to air for 20 seconds. The plaited fabric was then allowed to dwell for 4 hours at 25° C.

After finishing the fabric as described in Example 1, a turquoise blue print was obtained, having a good fastness to light and wet processing.

EXAMPLE 10

40 parts of a mixture of dyestuffs of the formulae

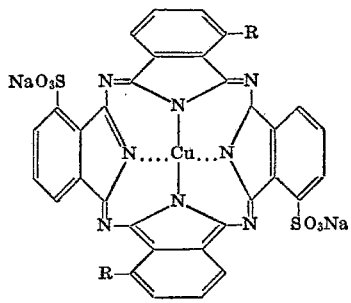

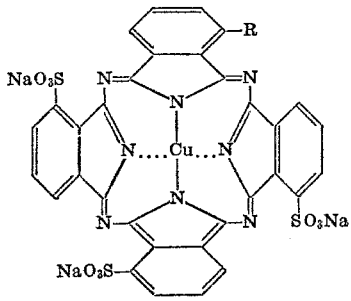

wherein R stands for the grouping

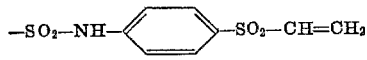

were mixed with 50 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener. After the addition of 15 parts of the sodium salt of meta-nitrobenzene sulphonic acid, the whole was made up to 1000 parts by the addition of 195 parts of water.

The printing paste prepared in such a way was then printed on a cotton fabric by means of a roller printing machine. After drying, the printed fabric was padded with a solution consisting of 100 parts by volume of sodium hydroxide solution (38° Bé.), 150 parts of sodium carbonate, 180 parts of sodium chloride, 50 parts of potassium carbonate and made up to 1000 parts by volume with water, and then exposed to air for 20 seconds. The plaited fabric was then stored for 4 hours at 23° C.

After finishing the fabric as described in Example 1, a turquoise blue print was obtained, having a good fastness to light and wet processing.

EXAMPLE 11

40 parts of the dyestuff of the formula

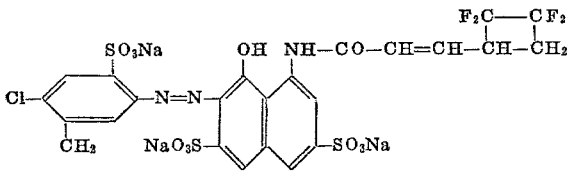

were mixed with 50 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener.

After the addition of 15 parts of the sodium salt of meta-nitrobenzene-sulphonic acid, the whole was made up to 1000 parts by the addition of 195 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 15 seconds. The plaited fabric was then stored for 1 hour at 20° C.

After finishing the fabric as described in Example 1, a red print was obtained, having a good fastness to light and wet processing.

EXAMPLE 12

40 parts of the dyestuff of the formula

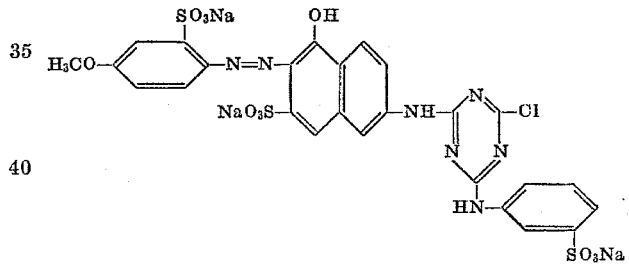

were mixed with 100 parts of urea, dissolved in 200 parts of hot water and introduced into 400 parts of an aqueous alginate thickener of 4% which contained 5 parts of a complex forming agent on the base of a polymeric sodium meta-phosphate per 1000 parts of thickener.

After the addition of 15 parts of the sodium salt of metanitrobenzene sulphonic acid, the whole was made up to 1000 parts by the addition of 245 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 20 seconds. The plaited fabric was then stored for 2 hours at 23° C.

After finishing the fabric as described in Example 1, a scarlet print was obtained, having a good fastness to light and wet processing.

EXAMPLE 13

40 parts of the dyestuff of the formula

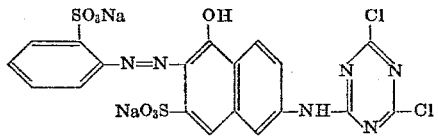

were mixed with 100 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener.

After the addition of 15 parts of the sodium salt of metanitrobenzene sulphonic acid, the whole was made up to 1000 parts by the addition of 145 parts of water.

The printing paste prepared in such a way was then printed on a linen fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 20 seconds. The plaited fabric was then stored for 10 minutes at 20° C.

After finishing the fabric as described in Example 1, an orange print was obtained, having a good fastness to light and wet processing.

EXAMPLE 14

40 parts of the dyestuff of the formula

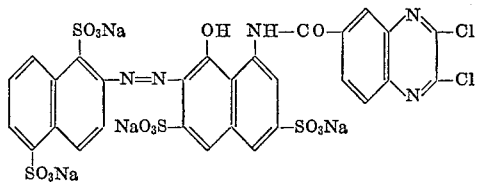

were mixed with 100 parts of urea, dissolved in 400 parts of hot water and introduced into 400 parts of an aqueous alginate thickener of 4% which contained 5 parts of a complex forming agent on the base of polymeric sodium meta-phosphate per 1000 parts of thickener.

After the addition of 15 parts of the sodium salt of meta-nitrobenzene sulphonic acid, the whole was made up to 1000 parts by the addition of 45 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate, and made up to 1000 parts by volume with water and then exposed to air for 15 seconds. The plaited fabric is then allowed to dwell for 10 minutes at 22° C.

After finishing the fabric as described in Example 1, a red print was obtained, having a good fastness to light and wet processing.

EXAMPLE 15

40 parts of the dyestuff of the formula

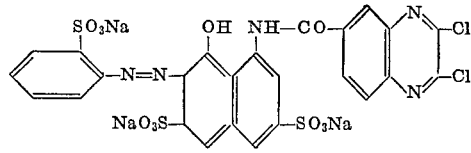

were mixed with 50 parts of urea, dissolved in 300 parts of hot water and introduced into 400 parts of an aqueous alginate thickener of 4% which contained 5 parts of a complex forming agent on the base of polymeric sodium meta-phosphate per 1000 parts of thickener.

After the addition of 15 parts of the sodium salt of meta-nitrobenzene sulphonic acid, the whole was made up to 1000 parts by the addition of 195 parts of water.

The printing paste prepared in such a way was then printed on a cotton fabric by means of a roller printing machine. After drying, the printed fabric was padded with a solution consisting of 100 parts by volume of sodium hydroxide solution (38° Bé), 150 parts of sodium carbonate, 180 parts of sodium chloride, 50 parts of potassium carbonate and made up to 1000 parts by volume with water, and then exposed to air for 15 seconds. The plaited fabric was then allowed to dwell for 10 minutes at 20° C.

After finishing the fabric as described in Example 1, a red print was obtained, having a good fastness to light and wet processing.

What is claimed is:

1. A process for producing fast prints on textile materials of natural or regenerated cellulose fibers with reactive dyestuffs, which comprises printing on said textile materials a printing paste containing a neutral to weakly alkaline thickening agent, water and either an organic dyestuff containing at least one β-hydroxyethylsulfonesulfuric acid ester group, vinylsulfone group, monochlorotriazine group, dichlorotriazine group, 2,2,3,3,-tetrafluorocyclobutane-1-acryloylamino group, vinylsulfonylamino group, β-phenyl sulfonylpropionylamino group or dichloroquinoxaline radical, or an organic dyestuff containing at least one nucleophilic group and a colourless organic compound having the formula (a) 1,3,5-tri-(acryloyl)-hexahydro-s-triazine of the formula

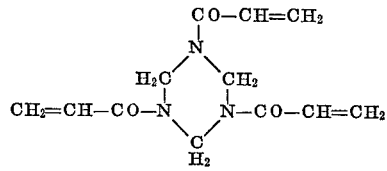

(b) methylene-bisacrylic acid amide of the formula

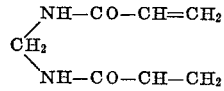

(c) 2,4,6-triethyleneimino-s-triazine of the formula

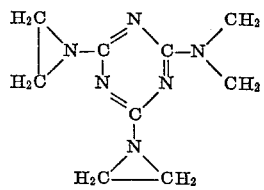

the reactive groups of them being capable of reacting with the fibre and with the nucleophilic groups of said dyestuff, then padding the print so obtained, after drying, with an aqueous salt-containing solution of an alkali metal hydroxide and subsequently dwelling the fabric at temperatures ranging from 10° to 30° C.

2. A process as claimed in claim 1, wherein the concentration of the alkali in the padding solution is such that the pH value is in the range of from 13 to 14.

3. A process as claimed in claim 1, wherein the minimum time of dwelling the print is 10 minutes.

References Cited

UNITED STATES PATENTS

| | | | |
|---|---|---|---|
| 3,043,650 | 7/1962 | Wegmann et al. | 8—54.2 |
| 3,044,843 | 7/1962 | Tullio | 8—17 |
| 3,084,017 | 4/1963 | Reeves et al. | 8—54.2 |
| 3,334,961 | 8/1967 | Kuhme et al. | 8—54.2 |
| 3,379,715 | 4/1968 | Chiddix et al. | 8—163 X |

FOREIGN PATENTS

| | | | |
|---|---|---|---|
| 679,670 | 10/1966 | Belgium | 8—54.2 |

GEORGE F. LESMES, Primary Examiner

T. J. HERBERT, JR., Assistant Examiner

U.S. Cl. X.R.

8—1 A